US010574937B2

(12) United States Patent
Geng

(10) Patent No.: US 10,574,937 B2
(45) Date of Patent: Feb. 25, 2020

(54) METHOD FOR HIGH-DEFINITION IMAGE PROCESSING, METHOD FOR HIGH-DEFINITION IMAGE PLAYBACK AND RELATED APPARATUS AND SYSTEM

(71) Applicant: BOE TECHNOLOGY GROUP CO., LTD., Beijing (CN)

(72) Inventor: Lihua Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 175 days.

(21) Appl. No.: 15/521,127

(22) PCT Filed: Sep. 12, 2016

(86) PCT No.: PCT/CN2016/098670
§ 371 (c)(1),
(2) Date: Apr. 21, 2017

(87) PCT Pub. No.: WO2017/118078
PCT Pub. Date: Jul. 13, 2017

(65) Prior Publication Data
US 2018/0091767 A1    Mar. 29, 2018
US 2018/0302592 A9    Oct. 18, 2018

(30) Foreign Application Priority Data

Jan. 4, 2016   (CN) .......................... 2016 1 0001240

(51) Int. Cl.
*H04N 7/01* (2006.01)
*G11B 27/34* (2006.01)
*H04N 5/775* (2006.01)

(52) U.S. Cl.
CPC .......... *H04N 7/0127* (2013.01); *G11B 27/34* (2013.01); *H04N 5/775* (2013.01); *H04N 7/0125* (2013.01)

(58) Field of Classification Search
CPC .... H04N 7/015; H04N 7/12; H04N 21/23602; H04N 21/4342; H04N 7/0127;
(Continued)

(56) References Cited

U.S. PATENT DOCUMENTS 3,983,328 A * 9/1976 Newell ................ H04N 5/7605
                                                386/203
4,660,096 A * 4/1987 Arlan ......................... G06T 3/40
                                                348/218.1
(Continued)

FOREIGN PATENT DOCUMENTS

CN          1694533 A      11/2005
CN        101697111 A       4/2010
(Continued)

OTHER PUBLICATIONS

English translation of PCT International Search Report, Application No. PCT/CN2016/098670, dated Nov. 28, 2016, 3 pages.
(Continued)

*Primary Examiner* — David E Harvey
(74) *Attorney, Agent, or Firm* — Armstrong Teasdale LLP

(57) ABSTRACT

A method for image processing has been disclosed. The method includes obtaining one or more images, wherein the one or more images are played at a first frame rate, segmenting each of the one or more images into a plurality of first sub-images based on a resolution supported by each of a plurality of connected interfaces of a display device, wherein the plurality of first sub-images match the resolution supported by each of a plurality of connected interfaces of a display device respectively, in response to a same synchronizing signal, adjusting synchronously the first frame rate of each of the plurality of first sub-images to a second frame rate respectively, converting each adjusted first sub-image to an output format corresponding to an output format of an interface matching the each adjusted first
(Continued)

sub-image, and providing each converted first sub-image to an interface matching the each converted first sub-image.

17 Claims, 6 Drawing Sheets

(58) Field of Classification Search
CPC .... H04N 7/0125; H04N 5/775; H04N 7/0117; G06F 3/1446; G09G 5/006; G09G 5/005; G09G 2340/0407; G09G 2370/00; G09G 2370/12; G09G 2370/08; G09G 2370/02; G11B 27/34
See application file for complete search history.

(56) References Cited

U.S. PATENT DOCUMENTS

| | | | | |
|---|---|---|---|---|
| 5,029,326 A * | 7/1991 | Tabata | ............... | H04N 7/0125 348/458 |
| 5,159,460 A * | 10/1992 | Senso | ............... | H04N 9/797 348/439.1 |
| 5,287,179 A * | 2/1994 | Senso | ............... | H04N 7/0112 348/383 |
| 5,392,071 A * | 2/1995 | Richards | ............... | H04N 5/262 348/E5.051 |
| 5,430,486 A * | 7/1995 | Fraser | ............... | G06T 3/4007 348/426.1 |
| 5,465,119 A * | 11/1995 | Demos | ............... | G06F 3/1423 348/447 |
| 5,481,306 A * | 1/1996 | Senso | ............... | H04N 9/7973 345/903 |
| 5,926,205 A * | 7/1999 | Krause | ............... | H04N 7/17336 348/E7.073 |
| 6,333,750 B1 * | 12/2001 | Odryna | ............... | G06F 3/14 345/1.1 |
| 6,340,994 B1 * | 1/2002 | Margulis | ............... | G09G 3/20 348/625 |
| 6,836,294 B2 * | 12/2004 | Miller | ............... | H04N 7/0135 348/441 |
| 7,218,328 B2 * | 5/2007 | Blackham | ............... | G09B 9/32 345/545 |
| 7,777,962 B2 * | 8/2010 | Bowers | ............... | B82Y 20/00 359/642 |
| 7,792,412 B2 * | 9/2010 | Nishitani | ............... | H04N 9/3147 345/1.1 |
| 7,898,575 B2 * | 3/2011 | Ishii | ............... | H04N 5/225 348/222.1 |
| 7,965,311 B2 * | 6/2011 | Oura | ............... | G09G 5/006 348/218.1 |
| 8,238,332 B2 * | 8/2012 | Yamashita | ............... | H04N 7/015 370/366 |
| 8,289,445 B2 * | 10/2012 | Yamashita | ............... | H04N 5/232 348/423.1 |
| 8,401,339 B1 * | 3/2013 | Anderson | ............... | G06K 9/36 382/298 |
| 8,421,915 B2 * | 4/2013 | Yamashita | ............... | H04N 7/015 348/14.12 |
| 8,427,579 B2 * | 4/2013 | Yi | ............... | H04N 7/0125 348/452 |
| 8,847,848 B2 * | 9/2014 | Kim | ............... | G09G 5/003 345/1.1 |
| 8,878,989 B2 * | 11/2014 | Minamoto | ............... | H04N 5/38 348/383 |
| 9,641,875 B2 * | 5/2017 | Nishida | ............... | H04N 21/2381 |
| 2004/0046772 A1 * | 3/2004 | Ouchi | ............... | G09G 5/005 345/690 |
| 2005/0088669 A1 * | 4/2005 | Suino | ............... | H04N 1/3875 358/1.2 |
| 2007/0171229 A1 * | 7/2007 | Mamiya | ............... | G06F 3/1446 345/503 |
| 2008/0186317 A1 * | 8/2008 | Minamihama | ............... | G09G 5/391 345/531 |
| 2010/0026722 A1 * | 2/2010 | Kondo | ............... | G09G 3/2007 345/660 |
| 2012/0008044 A1 * | 1/2012 | Nagata | ............... | H04N 5/445 348/478 |
| 2012/0062552 A1 * | 3/2012 | Bae | ............... | H04N 13/139 345/419 |
| 2012/0300124 A1 * | 11/2012 | Yamashita | ............... | H04N 7/01 348/441 |
| 2014/0119675 A1 * | 5/2014 | Kim | ............... | G06F 3/1446 382/299 |
| 2014/0267285 A1 * | 9/2014 | Lee | ............... | G06T 5/00 345/428 |
| 2014/0362295 A1 * | 12/2014 | Suzuki | ............... | G09G 5/003 348/564 |
| 2015/0016748 A1 * | 1/2015 | Ko | ............... | G06T 1/20 382/299 |
| 2015/0098019 A1 * | 4/2015 | Takahashi | ............... | G06F 3/1446 348/502 |
| 2015/0101002 A1 * | 4/2015 | Yamashita | ............... | H04N 21/23602 725/116 |
| 2016/0065892 A1 * | 3/2016 | Suzuki | ............... | H04N 7/12 348/388.1 |
| 2016/0133224 A1 * | 5/2016 | Nakajima | ............... | G06F 3/1446 348/445 |
| 2016/0192027 A1 * | 6/2016 | Toma | ............... | H04N 21/42615 725/118 |
| 2016/0337706 A1 * | 11/2016 | Hwang | ............... | H04N 21/23614 |
| 2017/0013284 A1 * | 1/2017 | Murakami | ............... | H04N 21/2343 |
| 2017/0078657 A1 * | 3/2017 | Rayner | ............... | H04N 21/238 |
| 2017/0098295 A1 * | 4/2017 | Urabe | ............... | G06T 3/40 |
| 2017/0243566 A1 * | 8/2017 | Nakai | ............... | H04N 7/015 |
| 2018/0013978 A1 * | 1/2018 | Duan | ............... | H04N 7/01 |
| 2018/0160155 A1 * | 6/2018 | Iguchi | ............... | H04N 21/23805 |

FOREIGN PATENT DOCUMENTS

| | | |
|---|---|---|
| CN | 101697114 A | 4/2010 |
| CN | 102857532 A | 1/2013 |
| CN | 103347144 A | 10/2013 |
| CN | 103595896 A | 2/2014 |
| CN | 104077103 A | 10/2014 |
| CN | 105141876 A | 12/2015 |
| CN | 105611213 A | 5/2016 |
| CN | 205265822 U | 5/2016 |
| JP | 2012060611 A | 3/2012 |
| WO | WO-2009104850 A1 * | 8/2009 ......... H04N 21/2365 |

OTHER PUBLICATIONS

PCT Written Opinion, Application No. PCT/CN2016/098670, dated Nov. 28, 2016, 6 pages.: with English translation of relevant part.
China First Office Action, Application No. 201610001240.2, dated Jan. 31, 2018, 18 pps.: with English translation.

* cited by examiner

METHOD FOR HIGH-DEFINITION IMAGE PROCESSING, METHOD FOR HIGH-DEFINITION IMAGE PLAYBACK AND RELATED APPARATUS AND SYSTEM

CROSS REFERENCE TO RELATED APPLICATIONS

This application is a National Stage Entry of PCT/CN2016/098670 filed Sep. 12, 2016, which claims the benefit and priority of Chinese Patent Application No. 201610001240.2, filed on Jan. 4, 2016, the disclosures of which are incorporated by reference herein in their entirety as part of the present application.

BACKGROUND

The embodiments of the disclosure relate to data processing field and, more particularly, to method for image processing, method for image playback and related apparatus and system.

With the development of Ultra High-Definition display technology, a resolution of a display system is getting higher and higher and a high definition system with 8K and 10K resolution has occurred for example. Since a high resolution picture contains huge data, the requirements for playing, processing and displaying the high resolution picture are higher and thus lead to expensive relevant device or system. Taking a playback system with 8K@60 Hz@10 bit as an example, a bandwidth of image data is required to achieve 59.8 Gbps and storing a minute's image content requires 448 GB storage space.

However, for certain specific applications such as an exhibition of an auction item of an auction company, an exhibition of a painting of a gallery, a slow animation, etc., they do not require high frame rate but only require high resolution. Therefore for the applications above, if an existing high definition system is used, then it may lead to high cost. Thus there is a requirement for an improved solution of image processing.

BRIEF DESCRIPTION

A first aspect of the disclosure provides a method for image processing. The method includes: obtaining one or more images, wherein the one or more images are played at a first frame rate, segmenting each of the one or more images into a plurality of first sub-images based on a resolution supported by each of a plurality of connected interfaces of a display device, wherein the plurality of first sub-images match the resolution supported by each of the plurality of connected interfaces of the display device respectively, in response to a same synchronizing signal, adjusting synchronously the first frame rate of each of the plurality of first sub-images to a second frame rate respectively, converting each adjusted first sub-image to an output format corresponding to an output format of an interface matching the each adjusted first sub-image, and providing each converted first sub-image to an interface matching the each converted first sub-image.

According to an embodiment, the one or more images are obtained from an apparatus for image playback, each of the one or more images includes a plurality of segmented second sub-images in each of which an image number and a second sub-image number are encoded, and the method further includes recovering each of the one or more images based on the image number and the second sub-image number.

According to an embodiment, information of the second frame rate is encoded in at least one second sub-image, and the method further includes obtaining the information of the second frame rate from the at least one second sub-image.

According to an embodiment, the image number, the second sub-image number, and the information of the second frame rate are encoded at the least significant bits of one or more pixel components respectively.

According to an embodiment, the one or more images are obtained from a local device.

According to an embodiment, the method further includes enhancing the one or more images.

According to an embodiment, the plurality of interfaces of the display device include VbyOne interfaces.

According to an embodiment, the one or more images include an 8K or 10K image.

According to an embodiment, the adjusting step includes storing each of the plurality of first sub-images in a local memory at the first frame rate, and in response to the same synchronizing signal, reading repeatedly each stored first sub-image at the second frame rate.

According to an embodiment, the one or more images are an 8K image, the plurality of connected interfaces of the display device include four VbyOne interfaces, and the segmenting step further includes segmenting each of the one or more images in a "田" shape to obtain four 4K images.

According to an embodiment, a frequency of the synchronizing signal is the first frame rate.

A second aspect of the disclosure provides an apparatus for image processing. The apparatus includes: an obtaining unit configured to obtain one or more images, wherein the one or more images are played at a first frame rate, a segmenting unit configured to segment each of the one or more images into a plurality of first sub-images based on a resolution supported by each of a plurality of connected interfaces of a display device, wherein the plurality of first sub-images match the resolution supported by each of a plurality of connected interfaces of a display device respectively, an adjusting unit configured to in response to a same synchronizing signal, adjust synchronously the first frame rate of each of the plurality of first sub-images to a second frame rate respectively, a converting unit configured to convert each adjusted first sub-image to an output format corresponding to an output format of an interface matching the each adjusted first sub-image, and a providing unit configured to provide each converted first sub-image to an interface matching the each converted first sub-image.

According to an embodiment, the one or more images are obtained from an apparatus for image playback, each of the one or more images includes a plurality of segmented second sub-images in each of which an image number and a second sub-image number are encoded, and the apparatus further includes a recovering unit configured to recover each of the one or more images based on the image number and the second sub-image number.

According to an embodiment, information of the second frame rate is encoded in at least one second sub-image, and the obtaining unit is further configured to obtain the information of the second frame rate from the at least one second sub-image.

According to an embodiment, the image number, the second sub-image number, and the information of the second frame rate are encoded at the least significant bits of one or more pixel components respectively.

According to an embodiment, the one or more images are obtained from the apparatus.

According to an embodiment, the apparatus further includes an enhancing unit configured to enhance the one or more images.

According to an embodiment, a plurality of interfaces of the display device include VbyOne interfaces.

According to an embodiment, the one or more images include an 8K or 10K image.

According to an embodiment, the adjusting unit is further configured to store each of the plurality of first sub-images in a local memory at the first frame rate, and in response to the same synchronizing signal, read repeatedly each stored first sub-image at the second frame rate.

According to an embodiment, the one or more images are an 8K image, the plurality of connected interfaces of the display device include four VbyOne interfaces, and the segmenting unit is further configured to segment each of the one or more images in a "III" shape to obtain four 4K images.

According to an embodiment, a frequency of the synchronizing signal is the first frame rate.

A third aspect of the disclosure provides a method for image playback. The method includes: segmenting each of one or more images to obtain a plurality of second sub-images, wherein the one or more images are played at a first frame rate, adding a marker to each of the plurality of second sub-images, and sending each sub-image with the added marker to an apparatus for image processing such that the apparatus for image processing is able to receive the one or more images at the first frame rate.

According to an embodiment, the marker includes an image number, a second sub-image number, and information of a second frame rate.

According to an embodiment, the image number, the second sub-image number, and the information of the second frame rate are encoded at the least significant bits of one or more pixel components respectively.

A fourth aspect of the disclosure provides an apparatus for image playback. The apparatus includes: a segmenting unit configured to segment each of one or more images to obtain a plurality of second sub-images, wherein the one or more images are played at a first frame rate, a marking unit configured to add a marker to each of the plurality of second sub-images, and a sending unit configured to send each sub-image with the added marker to an apparatus for image processing such that the apparatus for image processing is able to receive the one or more images at the first frame rate.

According to an embodiment, the marker includes an image number, a second sub-image number, and information of a second frame rate.

According to an embodiment, the image number, the second sub-image number, and the information of the second frame rate are encoded at the least significant bits of one or more pixel components respectively.

A fifth aspect of the disclosure provides a system for image processing. The system for image processing includes: the apparatus for image processing and the apparatus for image playback as described above.

The above embodiments, by employing technologies such as image segmentation, image identification, image synchronization, frame rate adjustment, etc., realize the playback of a low frame rate and high resolution image or video such as 8K or 10K image or video and reduce the system performance requirements and can use a device such as ordinary PC which cannot play or output a high-definition image or video as a player for the 8K or 10K image or video, thereby reducing cost. In addition, since the techniques such as image segmentation etc. are employed, the segmented images can be processed in parallel such that the process speed can be improved.

BRIEF DESCRIPTION OF THE DRAWINGS

Reference will hereinafter be made to the accompanying drawings which are not necessarily drawn to scale, wherein.

DETAILED DESCRIPTION

The embodiments of the disclosure will be described with reference to the accompanying drawings. Details are set forth in the following description in order that those skilled in the art can completely understand and implement the embodiments of the disclosure. It is apparent, however, to those skilled in the art that the embodiments may be implemented without some of these specific details. In addition, it should be understood that the disclosure is not limited to the described specific embodiments. On the contrary, any combination of following features and elements may be considered to implement the embodiments of the disclosure no matter whether they relates to different embodiments. Therefore, the following aspects, features, embodiments and advantages are only used for illustration rather than construed as being elements or limitation of Claims unless the context clearly indicates in the Claims.

Each embodiments of the disclosure will hereafter be described in detail with reference to Figures. The following description is only exemplary rather than limits the disclosure to this.

The Operating Environment of Embodiments of the Disclosure

Figure 1:
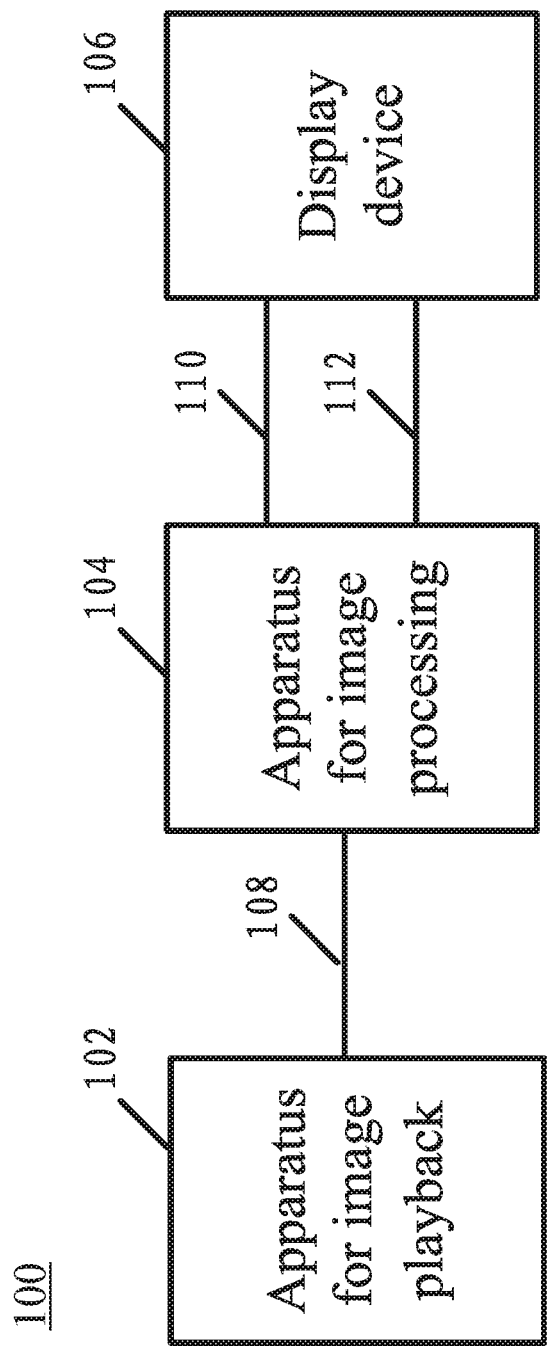
FIG. 1 schematically shows an exemplary operating environment, in which some embodiments of the present disclosure can be implemented.

FIG. 1 schematically shows an exemplary operating environment 100, in which some embodiments of the present disclosure can be employed.

As shown in FIG. 1, the operating environment 100 may include an apparatus for image processing 104 according to embodiments of the disclosure, which can connect with a display device 106 through one or more interfaces and provide to the display device an image required to be displayed. The connections 110 and 112 between the apparatus for image processing 104 and the display device 106 may be connections associated with the corresponding interfaces. The interface of the display device 106 may include a DVI interface, a HDMI interface, a DisplayPort (DP) interface, a VbyOne interface, any other suitable interface or a future development interface. It should be noted that though only two connections 110 and 112 are shown in FIG. 1, there may be any suitable number of connections between the apparatus for image processing 104 and the display device 106. In addition, the connections between them may be the same or different connections depending on the interfaces used.

The apparatus for image processing 104 may be implemented by employing one of any suitable programmable circuit including one or more system and microcontroller, microprocessor, reduced instruction-set computer (RISC), application specific integrated circuit (ASIC), programmable logic circuit, field programmable gate array (FPGA) and any other circuit capable of implementing functionality as described herein.

The operating environment 100 further includes the display device 106 which may be any suitable existing or future development display device. For example, the display device 106 may be a liquid crystal display, a high definition television, a projector, or a display device formed by splicing a plurality of display panels. In general, the display device 106 may have a plurality of suitable interfaces for receiving an image. For example, the interfaces may include a DVI interface, a HDMI interface, a DP interface, a VbyOne interface, any other suitable interface or a future development interface. For example, the display device 106 may include four VbyOne interfaces in the case of playing an 8K image or video.

In addition, the operating environment 100 further includes an apparatus 102 for image playback. The apparatus 102 for image playback is used to transmit an image or video required to be played to the apparatus for image processing 104 and is able to connect with the apparatus for image processing 104 through one or more kinds of interfaces. A connection 108 between the apparatus for image processing 104 and the apparatus for image playback 102 may be a wired connection and/or a wireless connection associated with a corresponding interface. The interface of the apparatus for image playback 102 may include a DVI interface, a HDMI interface, a DP interface, a VbyOne interface, a WHDI interface, a WirelessHD interface, a WiDi interface, a WiGig interface, any other suitable interface or a future development interface. It should be noted that though only one connection 108 is shown in FIG. 1, there may be any suitable number of connections between the apparatus for image processing 104 and the display device 106. In addition, a plurality of connections between them may be the same or different connections depending on the interfaces used. For example, if the apparatus for image playback 102 is implemented by a normal computer, then it may include a DVI/HDMI/DP connection.

The apparatus for image playback 102 may include but not limit to a desktop computer, a laptop computer, a computing device, a mobile computer, a mobile computing device, a tablet, a sever, a cloud computer, a virtual machine, a personal digital assistant (PDA), a mobile phone, a smart phone, etc.

It should be noted that the apparatus for image playback 102 such as a normal computer cannot output a high definition image or video such as 8K or 10K image or video, etc in the present embodiments, therefore the apparatus for image playback 102 cannot transmit directly the image or video required to be displayed to the display device 106. In other words, the apparatus for image playback 102 can only directly output an image whose resolution is smaller than a resolution of image that can be displayed by the display device 106.

In addition, the apparatus for image playback 102 may not be required in some embodiments. For example, the apparatus for image processing 104 may integrate the functionality of the apparatus for image playback 102.

A Method for Image Processing

A schematic flow chart of a method for image processing may hereinafter be described in detail with reference to FIG. 2 in connection with FIG. 1 according to embodiments of the disclosure. The method for image processing in FIG. 2 may be executed by the apparatus for image processing 104.

Figure 2:
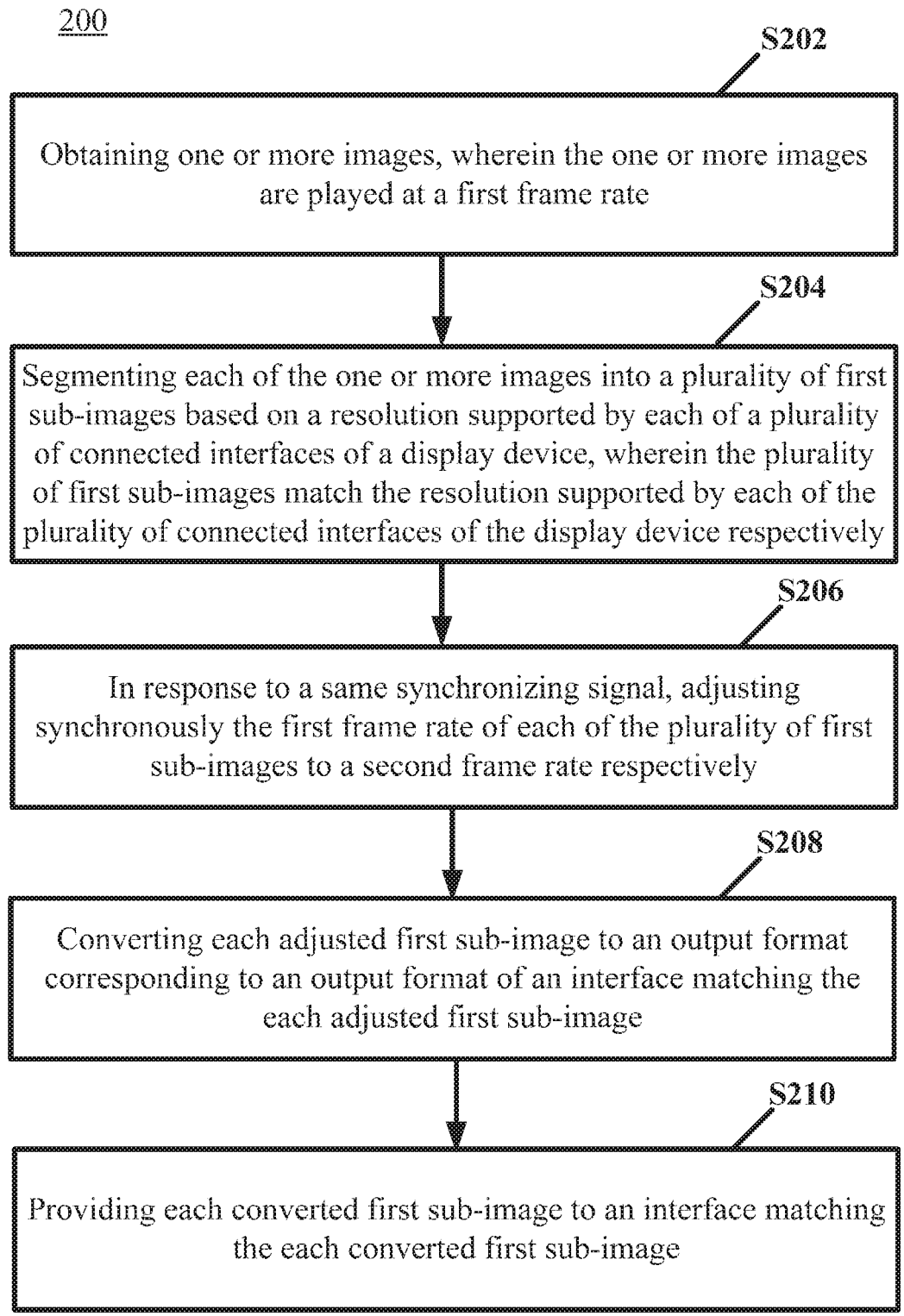
FIG. 2 schematically shows a method for image processing in accordance with an embodiment of the present disclosure.

As shown in FIG. 2, the method 200 includes obtaining one or more images at step S202, wherein the one or more images are played at a first frame rate. As described herein, the image may include a static image or a video image, for example, a video may consist of a plurality of static images. A resolution of an image may be 8K such as 7680*4320, 10K such as 10240*4320 or any other suitable resolution. The first frame rate is smaller than 24 Hz, for example, the first frame rate may be 1 frame per second or any other suitable value. The color format of an image may be RGB 4:4:4 or any other applicable color format. A depth of a color component of an image may be 8, 10, 12, 14 or 16 bits or any other applicable depth.

In an embodiment, the apparatus for image processing 104 may obtain the one or more images from the apparatus for image playback 102 in step S202. For example, the apparatus for image playback 102 may transmit a whole image to the apparatus for image processing 104 through an applicable communication interface such as a USB 3.0 interface between the apparatus for image playback 102 and the apparatus for image processing 104. In addition, if the applicable communication interface between them does not support a transmission of the whole image, for example, the communication interface is a DVI interface supporting a transmission of a 1920*1080 resolution image, then the apparatus for image playback 102 may segment the image and then transmit the segmented image to the apparatus for image processing 104 through the DVI interface. It is noted that it should be ensured that the apparatus for image processing 104 can obtain the one or more images at the first frame rate no matter what means is employed by the apparatus for image playback 102 to transmit the one or more images.

In a case that the apparatus for image playback 102 transmits the one or more images by employing a means for segmenting the image, each of the one or more images may include a plurality of segmented second sub-images, and an image number and a second sub-image number are encoded in each second sub-image. The means for segmenting the image employed by the apparatus for image playback 102 may be depend on a way of image transmission between the apparatus for image playback 102 and the apparatus for image processing 104. For example, if a display interface is used to transmit an image, then the image may be segmented into a plurality of second sub-images with a resolution which can be supported by the display interface. As an example, supposing that the resolution of an image is 7680*4320, the first frame rate of the image is 1 frame per second, and a DVI interface employed by the apparatus for image playback 102 and the apparatus for image processing 104 supports a 1920*1080 resolution, then the apparatus for image playback 102 may segment each image into 16 second sub-images with 1920*1080 resolution and an output frame rate is 16 frame per second, such that the apparatus for image processing 104 may obtain the one or more images at the first frame rate. In addition, if the apparatus for image playback 102 employs various transmission modes to transmit the one or more images, then each image may be segmented into second sub-images corresponding to each transmission mode. It is noted that the second sub-images may have the same or different resolutions since a way of segmenting an image may be uniform or non-uniform. After segmenting an image into the plurality of second sub-images, the apparatus for image playback 102 may add an image number and a second sub-image number to each second sub-image. For example, all the second sub-images belonging to the same image have the same image number, and different second sub-images belongs to the same image may have different second sub-image number. The number may be a binary digit. It is noted that the apparatus for image playback 102 and the apparatus for image processing 104 know the numbering rule of both the image number and the second sub-image number in advance. The numbering rule may be predefined or determined by a negotiation between the two apparatus, or the apparatus for image playback 102 may inform the apparatus for image processing 104 of the numbering rule.

In an embodiment, information of a second frame rate is encoded in at least one second sub-image. The second frame rate is the frame rate to be transmitted to the display device 106. In general, the second frame rate is greater than or equal to 24 Hz, for example, it may be 60 Hz, 120 Hz or any other suitable frequency. In addition, the second frame rate is greater than the first frame rate. In other embodiments, the second frame rate may not be encoded in a second sub-image, but predefined, or the apparatus for image playback 102 may inform the apparatus for image processing 104 of the second frame rate in advance.

In an embodiment, the image number, the second sub-image number, and the information of the second frame rate may be encoded at the least significant bits of one or more pixel components respectively. In addition, the image number, the second sub-image number and the information of the second frame rate may employ the suitable number of bits respectively depending on the amount of information required to be transmitted. For example, if the image number employs 3 bits, then each image such as an 8K image may be marked circularly from 0 to 7 such that it can recognize an image to which each second sub-image belongs and prevent from stitching second sub-images belonging to different images together due to system errors. If the second sub-image number employs 5 bits, then 0 to 15 may be used to mark 16 second sub-images. The second frame rate may employ 1 bit, for example, 0 represents 60 Hz and 1 represents 120 Hz. In a case of RGB color mode, marker locations may be at the last bit of each pixel component of the first, second and third pixels of each second sub-image, wherein a pixel includes three pixel components. For example, a way for marking may be that the last bits of red, green and blue components of the first pixel of a second sub-image are used to mark the original image number, the last bits of the red, green and blue components of the second pixel of the second sub-image and the last bits of red and green components of the third pixel of the second sub-image are used to mark the second sub-image number, and the last bit of blue component of the third pixel of the second sub-image is used to mark the second frame rate. In other embodiments, encoding locations may be at the last bit of each pixel component of any three pixels in each second sub-image. Since the least significant bits are used as marking bits, it will not have an excessive impact on the original image.

In an embodiment, after the apparatus for image processing 104 obtains each second sub-image in which the image number and the second sub-image number are encoded, the method 200 further includes a recovery step. In the recovery step, each of the one or more images is recovered according to the image number and the second sub-image number. For example, the apparatus for image processing 104 may recognize the location of each second sub-image in an original image according to the encoding rule and then recovery the original image.

In an embodiment, the one or more images are obtained from a local device, i.e., the apparatus for image processing 104. For example, the apparatus for image processing 104 may read the one or more images from its storage or memory at the first frame rate, thereby obtaining the one or more images. In this case, the image may not be segmented. In addition, the information of the second frame rate may also be stored in the storage or memory of the apparatus for image processing 104, therefore the apparatus for image processing 104 may obtain the information of the second frame rate.

In an embodiment, after obtaining the one or more images, the method 200 further includes a step of enhancing the one or more images. For example, image parameters such as contrast, saturation, brightness, white balance, etc. may be adjusted, wherein each parameter may be pre-defined.

The method may then proceed to step S204. In step S204, each of the one or more images is segmented into a plurality of first sub-images based on a resolution supported by each of a plurality of connected interfaces of a display device, wherein the plurality of first sub-images match the resolution supported by each of the plurality of connected interfaces of the display device. In an embodiment, the plurality of connected interfaces of the display device 106 may include any suitable interface suitable for communicating with the apparatus for image processing 104. For example, the interfaces of the display device may include a DVI interface, a HDMI interface, a DP interface, a VbyOne interface, any other suitable interface or future development interface as described above. For example, in a case of playing an 8K image or video, the display device 106 may include four VbyOne interfaces. The resolution supported by an interface may be obtained through information exchanged between the apparatus for image processing 104 and the display device 106 when the apparatus for image processing 104 connects with the display device 106, or by any other suitable means. It is noted that the plurality of connected interfaces of the display device 106 may be the same or different type of interfaces.

In an embodiment, the resolution of the images obtained at step S202 by the apparatus for image processing 104 is 8K such as 7680*4320, four VbyOne interfaces are connected between the apparatus for image processing 104 and the display device 106, and the resolution supported by each VbyOne interface is 4K such as 3840*2160, then the apparatus for image processing 104 may segment an 8K image in a "田" shape to obtain four 4K images. In another embodiment, the resolution of images obtained at step S202 by the apparatus for image processing 104 are 10K such as 10240*4320, eight VbyOne interfaces are connected between the apparatus for image processing 104 and the display device 106, and the resolution supported by each VbyOne interface is 4K such as 3840*2160, then the apparatus for image processing 104 may segment an 8K image into eight 4K images evenly.

After generating the plurality of first sub-images, the method 200 proceeds to step S206. In step S206, in response to a same synchronizing signal, the first frame rate of each of the plurality of first sub-images is adjusted synchronously to the second frame rate respectively. In this embodiment, the second frame rate is greater than the first frame rate, for example, it may be 60 Hz, 120 Hz or any other suitable frequency. The second frame rate may be encoded in at least one second sub-image or predefined. The same synchronizing signal may be generated by the apparatus for image processing 104 and transmitted respectively to adjusting elements used for adjusting the first frame rate of each first sub-frame in the apparatus for image processing 104. Each adjusting element adjusts synchronously the first frame rate of each first sub-image to the second frame rate after receiving the synchronizing signal. Since the images obtained by the apparatus for image processing 104 are played at the first frame rate, each first sub-image is played at the first frame rate. Each adjusting element should complete adjusting synchronously the first frame rate of each first sub-image to the second frame rate before receiving next synchronizing signal. Therefore the frequency of the synchronizing signal cannot be greater than the first frame rate. In addition, the frequency of the synchronizing signal is equal to the first frame rate in an embodiment.

In an embodiment, each adjusting element stores each of the plurality of first sub-images in a local memory at the first frame rate in step S206 and read repeatedly each stored first sub-image at the second frame rate in response to the same synchronizing signal. The local memory is a memory of the apparatus for image processing 104, which may include random access memory (RAM) such as DDR3 RAM, DDR4 RAM or any other suitable memory. Each adjusting element may have its own memory.

In other embodiments, any suitable means may be employed to adjust synchronously the first frame rate of each first sub-image of the plurality of sub-images to the second frame rate respectively in step S206.

After adjusting synchronously the first sub-images to the second frame rate, the method 200 proceeds to step S208. In step S208, each adjusted first sub-image is converted to an output format corresponding to an output format of an interface matching the each adjusted first sub-image. As described above, the display device 106 may include various interfaces. Therefore each first sub-image is required to be converted to an output format corresponding to an output format of an interface matching the each first sub-image before the each first sub-image is transmitted to the display device 106. If a first sub-image is output at a VbyOne interface, then the first sub-image is required to be converted to a VbyOne interface format. Similarly, if a first sub-image is output at another interface, then the first sub-image is required to be converted to a corresponding interface format. In step S208, the apparatus for image processing 104 may use any suitable converting means to convert each adjusted first sub-image to an output format corresponding to an output format of an interface matching the each adjusted first sub-image.

Then each converted first sub-image is provided to an interface matching the each converted first sub-image in step S210.

A Method for Image Playback

A schematic flow chart of a method for image playback may hereinafter be described in detail with reference to FIG. 3 in connection with FIG. 1 according to embodiments of the disclosure. The method for image playback in FIG. 3 may be executed by the apparatus for image playback 102.

Figure 3:
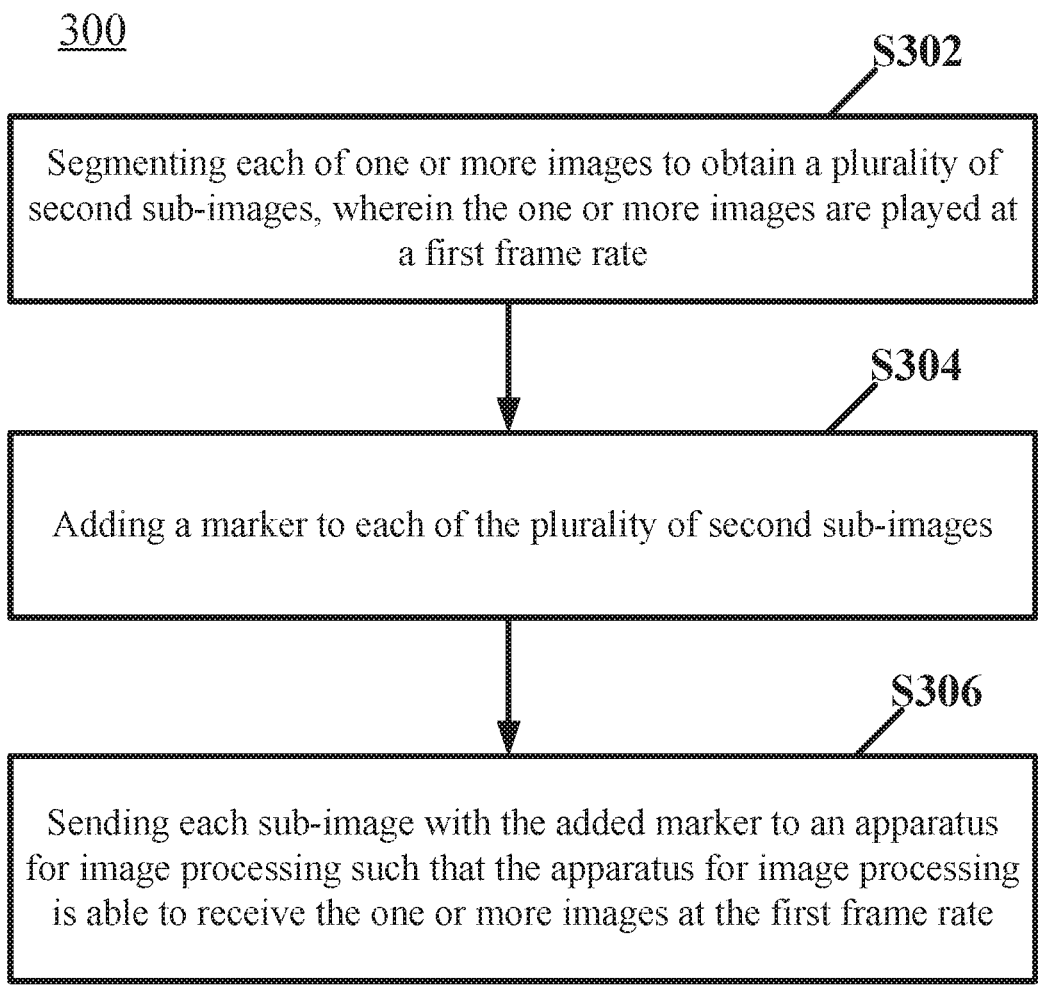
FIG. 3 schematically shows a method for image playback in accordance with an embodiment of the present disclosure.

As shown in FIG. 3, the method 300 includes segmenting each of one or more images to obtain a plurality of second sub-images at step S302, wherein the one or more images are played at a first frame rate. As described above, the images may include a static image or a video image. A resolution of the images may be 8K such as 7680*4320, 10K such as 10240*4320 or any other suitable resolution. The first frame rate is smaller than 24 Hz, for example, the first frame rate may be 1 frame per second or any other suitable value. The color format of an image may be RGB 4:4:4 or any other applicable color format. A depth of a color component of an image may be 8, 10, 12, 14 or 16 bits or any other applicable depth. It is noted that the apparatus for image playback 102 cannot play directly an image such as 8K or 10K image. In step S302, a means for segmenting an image employed by the apparatus for image playback 102 may be depending on a transmission mode between the apparatus for image playback 102 and the apparatus for image processing 104. For example, if a display interface is used to transmit an image, then the image may be segmented into second sub-images that can be supported by the display interface. As an example, supposing that the resolution of an image is 7680*4320, a DVI interface used by the apparatus for image playback 102 and the apparatus for image processing 104 supports 1920*1080 resolution, and the first frame rate of the images is 1 frame per second, then the apparatus for image playback 102 may segment each image into 16 second sub-images with 1920*1080 resolution. In addition, if the apparatus for image playback 102 employs various transmission modes to transmit the one or more images, then each image may be segmented into second sub-images corresponding to each transmission mode. It is noted that a way of segmenting an image may be uniform or non-uniform, therefore the second sub-images may have the same or different resolutions.

After segmenting an image into a plurality of second sub-images, a marker is added to each of the plurality of second sub-images. The apparatus for image playback 102 may add an image number and a second sub-image number to each second sub-images. For example, all the second sub-images belonging to the same image have the same image number, and different second sub-images belongs to the same image may have different second sub-image numbers. The number may be a binary digit. It is noted that the apparatus for image playback 102 and the apparatus for image processing 104 know the numbering rule of the image number and the second sub-image number in advance. The numbering rule may be predefined or determined by a negotiation between the two apparatus, or the apparatus for image playback 102 may inform the apparatus for image processing of the numbering rule. In addition, the apparatus for image playback 102 may add information of a second frame rate to at least one second sub-image. In general, the second frame rate is greater than or equal to 24 Hz, for example, it may be 60 Hz, 120 Hz or any other suitable frequency. In addition, the second frame rate is greater than the first frame rate. In an embodiment, the marker may include the image number, the second sub-image number, and the information of the second frame rate.

In an embodiment, the image number, the second sub-image number, and the information of the second frame rate may be encoded at the least significant bits of one or more pixel components respectively. Since the least significant bits are used as marking bits, it will not have an excessive impact on the original image.

After adding a marker to each sub-image of the plurality of second sub-image, each marked sub-image may be transmitted to the apparatus for image processing 104 in step S306 such that the apparatus for image processing 104 can receive the one or more images at the first frame rate. As an example, supposing that the resolution of an image is 7680*4320, a DVI interface used by the apparatus for image playback 102 and the apparatus for image processing 104 supports a 1920*1080 resolution, and the first frame rate of the image is 1 frame per second, then the apparatus for image playback 102 may segment each image into 16 second sub-images with 1920*1080 resolution in step S302. Then in step S304, the marker is added to each sub-image of the plurality of second sub-images, and in step S306, the output frame rate of the second sub-images is 16 frame per second such that the apparatus for image processing 104 may obtain the one or more images at the first frame rate.

An Apparatus for Image Processing

Figure 4:
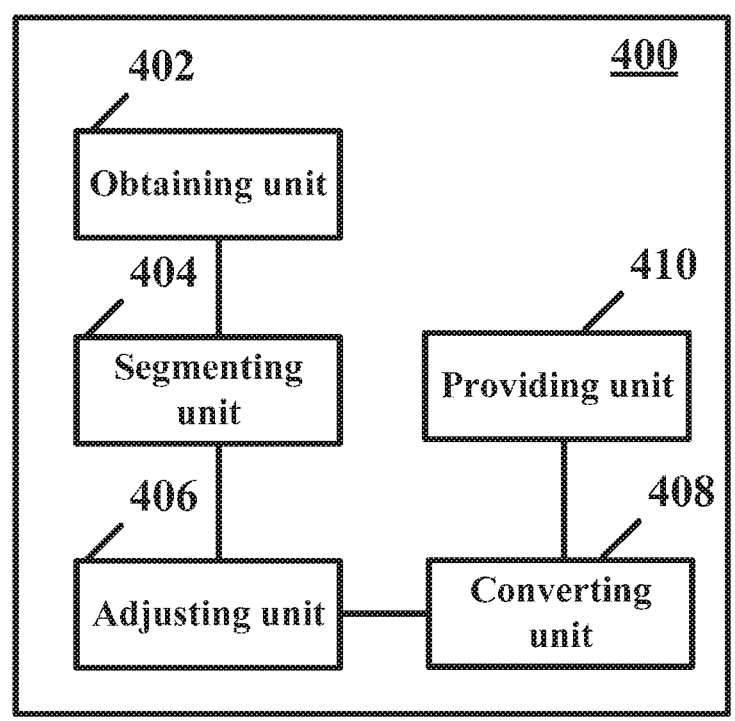
FIG. 4 schematically shows a block diagram of an apparatus for image processing in accordance with an embodiment of the present disclosure.

Based upon the same inventive concept as method 200, FIG. 4 shows a block diagram of an apparatus for image processing in accordance with an embodiment of the present disclosure. The apparatus for image processing 400 will be described below with reference to FIG. 4. For same parts as described in the previous embodiments, the description thereof is omitted for brevity.

As shown in FIG. 4, the apparatus for image processing 400 includes an obtaining unit 402 configured to obtain one or more images, wherein the one or more images are played at a first frame rate, for example, the obtaining unit 402 may execute the step S202 as described with reference to FIG. 2, a segmenting unit 404 configured to segment each of the one or more images into a plurality of first sub-images based on a resolution supported by each of a plurality of connected interfaces of a display device, wherein the plurality of first sub-images match the resolution supported by each of the plurality of connected interfaces of the display device, for example, the segmenting unit 404 may execute the step S204 as described with reference to FIG. 2, an adjusting unit 406 configured to in response to a same synchronizing signal, adjust synchronously the first frame rate of each of the plurality of first sub-images to a second frame rate respectively, for example, the adjusting unit 406 may execute the step S206 as described with reference to FIG. 2, a converting unit 408 configured to convert each adjusted first sub-image to an output format corresponding to an output format of an interface matching the each adjusted first sub-image, for example, the converting unit 408 may execute the step S208 as described with reference to FIG. 2, and a providing unit 410 configured to provide each converted first sub-image to an interface matching the each converted first sub-image, for example, the providing unit 410 may execute the step S410 as described with reference to FIG. 2. It is noted that though the apparatus for image processing 400 as shown in FIG. 4 includes only one adjusting unit 406, one converting unit 408 and one providing unit 410, each segmented first sub-image may correspond to one adjusting unit 406, one converting unit 408 and one providing unit 410 in other embodiments. In other words, one adjusting unit 406, one converting unit 408, and one providing unit 410 may constitute a processing channel for processing a corresponding first sub-image of segmented first sub-images.

In an embodiment, the one or more images are obtained from an apparatus for image playback. Each image of the one or more images may include a plurality of segmented second sub-images in each of which an image number and a second sub-image number are encoded. The apparatus for image processing 400 further includes a recovering unit (not shown) configured to recover each of the one or more images based on the image number and the second sub-image number. For example, the recovering unit may execute the recovery step as described with reference to method 200.

In an embodiment, information of the second frame rate is encoded in at least one second sub-image, and the obtaining unit 402 is further configured to obtain the information of the second frame rate from the at least one second sub-image.

In an embodiment, the image number, the second sub-image number, and the information of the second frame rate are encoded at the least significant bits of one or more pixel components respectively.

In an embodiment, the one or more images are obtained from the apparatus for image processing 400.

In an embodiment, the apparatus for image processing 400 further includes an enhancing unit (not shown) configured to enhance the one or more images. For example, the enhancing unit may execute the enhancing step as described with reference to method 200.

In an embodiment, the plurality of interfaces of the display device include VbyOne interfaces.

In an embodiment, the one or more images include an 8K or 10K image.

In an embodiment, the adjusting unit 406 is further configured to store each of the plurality of first sub-images in a local memory at the first frame rate, and in response to the same synchronizing signal, read repeatedly each stored first sub-image at the second frame rate. For example, the adjusting unit 406 may execute the step S206 as described with reference to method 200.

In an embodiment, the one or more images are an 8K image, the plurality of connected interfaces of the display device include four VbyOne interfaces, and the segmenting unit 404 is further configured to segment each of the one or more images in a "|||" shape to obtain four 4K images. For example, the segmenting unit 404 may execute the step S206 as described with reference to method 200.

In an embodiment, a frequency of the synchronizing signal is the first frame rate.

An Apparatus for Image Playback

Figure 5:
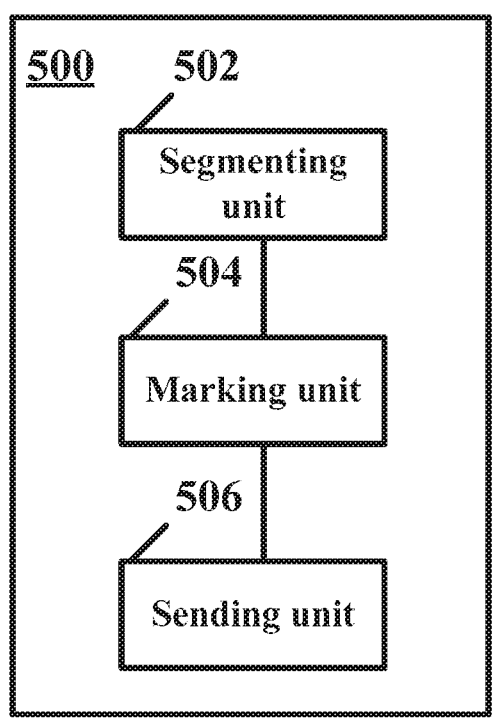
FIG. 5 schematically shows a block diagram of an apparatus for image playback in accordance with an embodiment of the present disclosure.

Based upon the same inventive concept as method 300, FIG. 5 shows a block diagram of an apparatus for image playback in accordance with an embodiment of the present disclosure. The apparatus for image playback 500 will be described below with reference to FIG. 5. For same parts as described in the previous embodiments, the description thereof is omitted for brevity.

As shown in FIG. 5, the apparatus for image playback 500 includes a segmenting unit 502 configured to segment each of one or more images to obtain a plurality of second sub-images, wherein the one or more images are played at a first frame rate, for example the segmenting unit 502 may execute the step S302 with reference to FIG. 3, a marking unit 504 configured to add a marker to each of the plurality of second sub-images, for example the marking unit 504 may execute the step S304 with reference to FIG. 3, and a sending unit 506 configured to send each sub-image with the added marker to an apparatus for image processing such that the apparatus for image processing is able to receive the one or more images at the first frame rate, for example the sending unit 506 may execute the step S306 with reference to FIG. 3.

In an embodiment, the marker includes an image number, a second sub-image number, and information of a second frame rate.

In an embodiment, the image number, the second sub-image number, and the information of the second frame rate are encoded at the least significant bits of one or more pixel components respectively.

A System for Image Processing

The system includes the apparatus for image processing 400 and the apparatus for image playback 500 as described above.

Figure 6:
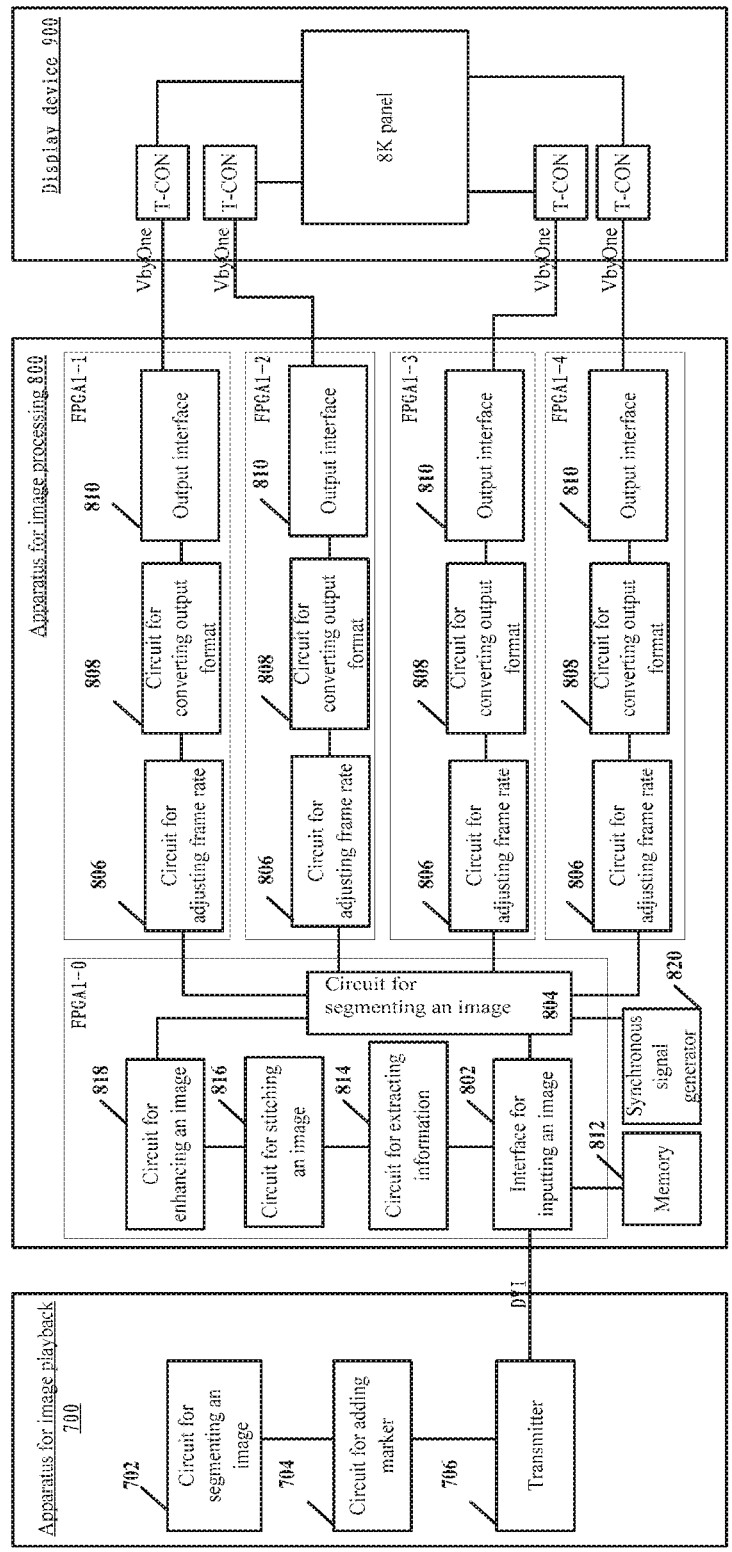
FIG. 6 schematically shows a block diagram of a system for image processing in accordance with another embodiment of the present disclosure, which is implemented by FPGA and can process 8K image or video.

FIG. 6 schematically shows a block diagram of a system for image processing in accordance with another embodiment of the present disclosure, which is implemented by FPGA and can process an 8K image or video. The circuits as shown in FIG. 6 may correspond to corresponding units in the apparatus for image processing 400 as described with reference to FIG. 4 and the apparatus for image playback 500 as described with reference to FIG. 5. As an example, supposing that the resolution of an image is 7680*4320, a DVI interface employed by the apparatus for image playback 700 and the apparatus for image processing 800 supports 1920*1080 resolution and a first frame rate of the images is 1 frame per second, then a circuit for segmenting an image 702 may segment each image into 16 second sub-images with 1920*1080 resolution, a circuit for adding marker 704 may add a marker to each of the second sub-images, then a transmitter 706 may transmit the second sub-images such that the apparatus for image processing 800 may obtain the one or more images at the first frame rate, wherein the output frame rate of the second sub-images is 16 frame per second. Then an interface for inputting an image 802 obtains the one or more images and sends the images to a circuit for extracting information 814, wherein the one or more images are input at the first frame rate. The circuit for extracting information 814 extracts the image number, the second sub-image number and information of the second frame rate and may store the second frame rate in a memory 812. Then a circuit for stitching an image 816 recoveries each of the one or more images according to the image number and the second sub-image number, and provides the recovered images to a circuit for segmenting an image 804. In another embodiment, the images may be stored in the memory 812, an interface for inputting an image 802 may obtain the one or more images from the memory 812, wherein the one or more images are input at the first frame rate. In an embodiment, a circuit for enhancing an image 818 may adjust parameters such as contrast, saturation, brightness, white balance, etc., wherein each parameter may be predefined Then for each obtained image, the circuit for segmenting an image 804 segments the image into a plurality of first sub-images corresponding to a plurality of output interfaces. In this embodiment, the number of the output interfaces are four and an 8K image may be segmented evenly into four 4K images for example in a "田" shape.

In this embodiment, the interface for inputting an image 802, the circuit for segmenting an image 804, the circuit for extracting information 814, the circuit for stitching an image 816, and the circuit for enhancing an image 818 may be implemented by FPGA as shown by block FPGA1-0 or any other suitable circuits.

Then the circuit for segmenting an image 804 transmits four 4K images to four circuits for adjusting frame rate 806 respectively. Each circuit for adjusting frame rate 806 adjusts the first frame rate of a first sub-image to the second frame rate, wherein the second frame rate is greater than the first frame rate. The synchronizing signal may be generated by a synchronous signal generator 820. The second frame rate may be obtained from the memory 812. In this embodiment, the synchronous signal generator 220 may transmit the signal to FPGA1-0, and then the circuit for segmenting an image 804 may provide the synchronous signal to four circuits for adjusting frame rate 806 respectively. In this embodiment, the synchronous signal is 1 Hz. Then a circuit for converting output format 808 converts an output format of each first sub-image whose frame rate has been adjusted into an output format corresponding to an interface matching the each first sub-image. In this embodiment, it is a VbyOne format. Then output interfaces 810 output the first sub-images to the display device 900 respectively.

In this embodiment, the circuits for adjusting frame rate 806, the circuits for converting output format 808 and the output interfaces 810 may be implemented by FPGA as shown by blocks FPGA 1-1, 1-2, 1-3 and 1-4 or any other suitable circuits. In addition, each FPGA may have its own memory (not shown).

Then the display device 900 may display the 8K image or video.

The above embodiments, by employing technologies such as image segmentation, image identification, image synchronization and frame rate adjustment, etc, realize the playback of a low frame rate and high resolution image or video such as 8K or 10K image or video, reduce the system requirements and can use a device such as an ordinary PC which cannot play or output a high-definition image or video as a player for the 8K or 10K image or video, thereby reducing cost. In addition, since the techniques such as image segmentation, etc are employed, the segmented images can be processed in parallel such that the process speed can be improved.

Though the embodiments of the disclosure have been described with reference to accompanying Figures, it should be understood by those skilled in the art that the above description is only exemplify rather than limits the disclosure. Various modifications and variations of embodiments of the disclosure can be made without departing from the spirit and the substance of the disclosure. The scope of the present disclosure is defined by the claims.

What is claimed is:

1. A method for image processing, comprising:
   obtaining from an apparatus for image playback a plurality of segmented second sub-images in each of which an image number and a second sub-image number are encoded;
   recovering one or more images based on the image number and the second sub-image number, wherein the one or more images are played at a first frame rate;
   segmenting the at least one image into a plurality of first sub-images based on a resolution supported by each of a plurality of connected interfaces of a display device, wherein the plurality of first sub-images match the resolution supported by each of the plurality of connected interfaces of the display device respectively;
   in response to a same synchronizing signal, adjusting synchronously the first frame rate of each of the plurality of first sub-images to a second frame rate respectively;
   converting each adjusted first sub-image to an output format corresponding to an output format of an interface matching the each adjusted first sub-image; and
   providing each converted first sub-image to an interface matching the each converted first sub-image.

2. The method according to claim 1, wherein information of the second frame rate is encoded in at least one second sub-image, and the method further comprises obtaining the information of the second frame rate from the at least one second sub-image.

3. The method according to claim 2, wherein the image number, the second sub-image number, and the information of the second frame rate are encoded at the least significant bits of one or more pixel components respectively.

4. The method according to claim 1, wherein the at least one image is obtained from a local device.

5. The method according to claim 1, further comprising enhancing the at least one image.

6. The method according to claim 1, wherein the plurality of interfaces of the display device comprise VbyOne interfaces.

7. The method according to claim 1, wherein the at least one image comprises at least one of an 8K and 10K image.

8. The method according to claim 1, wherein the adjusting step comprises storing each of the plurality of first sub-images in a local memory at the first frame rate, and in response to the same synchronizing signal, reading repeatedly each stored first sub-image at the second frame rate.

9. The method according to claim 1, wherein the at least one image is an 8K image, the plurality of connected interfaces of the display device comprise four VbyOne interfaces, and the segmenting step further comprises segmenting the at least one image as in a quadrant shape to obtain four 4K images.

10. The method according to claim 1, wherein a frequency of the synchronizing signal is the first frame rate.

11. An apparatus for image processing, comprising:
an obtaining circuit configured to obtain from an apparatus for image playback a plurality of segmented second sub-images in each of which an image number and a second sub-image number are encoded;
a recovering circuit configured to recover one or more images based on the image number and the second sub-image number, wherein the one or more images are played at a first frame rate;
a segmenting circuit configured to segment the at least one image into a plurality of first sub-images based on a resolution supported by each of a plurality of connected interfaces of a display device, wherein the plurality of first sub-images match the resolution supported by each of the plurality of connected interfaces of the display device respectively;
an adjusting circuit configured to, in response to a same synchronizing signal, adjust synchronously the first frame rate of each of the plurality of first sub-images to a second frame rate respectively;
a converting circuit configured to convert each adjusted first sub-image to an output format corresponding to an output format of an interface matching the each adjusted first sub-image; and
a providing circuit configured to provide each converted first sub-image to an interface matching the each converted first sub-image.

12. The apparatus according to claim 11, wherein information of the second frame rate is encoded in at least one second sub-image, and wherein the obtaining circuit is further configured to obtain the information of the second frame rate from the at least one second sub-image.

13. The apparatus according to claim 12, wherein the image number, the second sub-image number, and the information of the second frame rate are encoded at the least significant bits of one or more pixel components respectively.

14. The apparatus according to claim 11, wherein the at least one image is obtained from the apparatus.

15. The apparatus according to claim 11, wherein the plurality of interfaces of the display device comprise VbyOne interfaces.

16. The apparatus according to claim 11, wherein the adjusting circuit is further configured to:
store each of the plurality of first sub-images in a local memory at the first frame rate; and
in response to the same synchronizing signal, read repeatedly each stored first sub-image at the second frame rate.

17. The apparatus according to claim 11, wherein the at least one image is an 8K image, the plurality of connected interfaces of the display device comprise four VbyOne interfaces, and the segmenting circuit is further configured to segment the at least one image as in a quadrant shape to obtain four 4K images.

* * * * *